United States Patent [19]

Schwarzmann

[11] Patent Number: 4,498,007
[45] Date of Patent: Feb. 5, 1985

[54] METHOD AND APPARATUS FOR NEUTRON RADIATION MONITORING

[75] Inventor: Alfred Schwarzmann, Mount Laurel, N.J.

[73] Assignee: RCA Corporation, New York, N.Y.

[21] Appl. No.: 390,869

[22] Filed: Jun. 22, 1982

[51] Int. Cl.³ ............................ G01T 3/00; G01T 3/08
[52] U.S. Cl. ................................ 250/390; 250/252.1; 250/370; 250/371; 250/391
[58] Field of Search ............... 250/252.1, 392, 390, 250/388, 370, 391, 371

[56] References Cited

U.S. PATENT DOCUMENTS 3,702,936  11/1972  Erickson ............................. 250/388
4,163,240   7/1979  Swinehart et al. .................. 250/390
4,229,733  10/1980  Tulenko et al. ..................... 250/388

OTHER PUBLICATIONS

Splichal, Jr., "Self-Auditing Multichannel Neutron Monitor", Nucl. Appl. Tech, 10 (2), Feb. 1971, pp. 221-223.

Primary Examiner—Alfred E. Smith
Assistant Examiner—Carolyn E. Fields
Attorney, Agent, or Firm—Joseph S. Tripoli; Robert L. Troike; Robert Ochis

[57] ABSTRACT

A self-calibrated neutron radiation monitor includes a flux responsive element comprised of intrinsic silicon neutron detectors and self-calibration resistors in a single structure. As the resistance of the flux responsive element increases to the value of successive calibration resistors, known increments of flux have been encountered.

10 Claims, 5 Drawing Figures

METHOD AND APPARATUS FOR NEUTRON RADIATION MONITORING

This invention relates to the field of radiation monitoring and more particularly to the field of monitoring neutron radiation.

Neutron radiation is known to be hazardous, both to living organisms and to semiconductor electronic equipment. With the increased use of radiation in industry and medicine, the problem of radiation monitoring has become more widespread, especially in the vicinity of actual or potential sources of radiation such as nuclear power plants and industries which use or create radioactive substances.

Present neutron radiation monitors generally require detailed calibration records in order for the quantity of neutron radiation to which they have been exposed to be accurately determined. These monitors are generally crystalline semiconductor devices which have inherent monitor-to-monitor variations in initial characteristics which result from fabrication process tolerances. These monitors have not been rendered immune to the adverse effects of these variations. A non-linear relationship between radiation dose and changes in the monitor's characteristics exaggerates these variations and introduces major uncertainties in radiation dosages in the absence of detailed individual calibration records. As a consequence, detailed traceability of individual monitors to specific calibration curves must be maintained in order to obtain accurate readings of the radiation exposure of a given monitor.

A simplified, accurate neutron radiation monitor is needed which does not require detailed traceability of individual monitors for accurate readings to be obtained.

The present invention overcomes the problems of the prior art by providing a self-contained, self-calibrated neutron radiation monitor. In accordance with one preferred embodiment, a crystalline neutron radiation sensor and a set of calibration resistors are packaged as a unit. The calibration resistors have resistance values which are not affected by neutron radiation. Each calibration resistor's resistance is equal to the "effective" resistance the radiation sensor will have under specified test conditions after exposure to a different known neutron radiation flux. The radiation sensor may preferably be an intrinsic semiconductor such as silicon. The monitor may be read by a reading system whch passes known currents through the sensor and through the calibration resistors and compares the voltage developed across the sensor and each of the calibration resistors to determine if the flux dosage level associated with each resistor has been exceeded.

Figure 1:
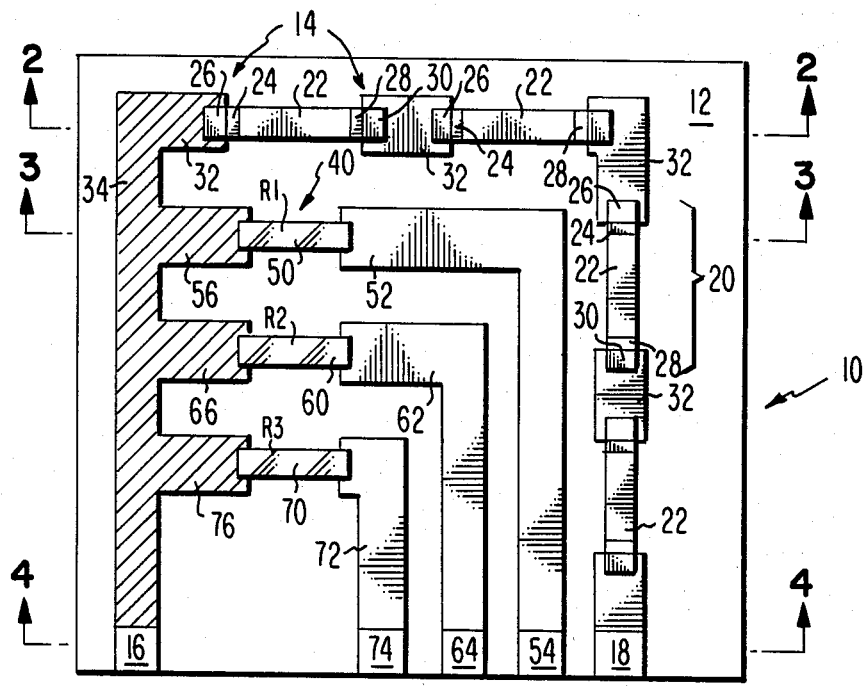
FIG. 1 is a schematic plan view of a precalibrated radiation monitor in accordance with the present invention.
Figure 2:
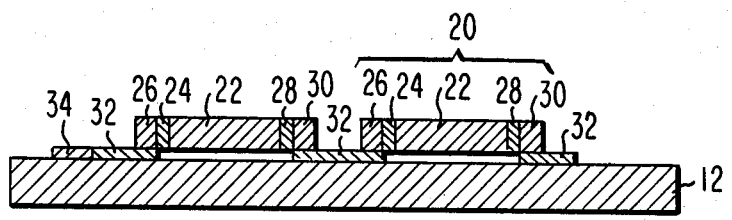
FIG. 2 is a cross-section through the structure of FIG. 1 taken along the line 2—2.
Figure 3:
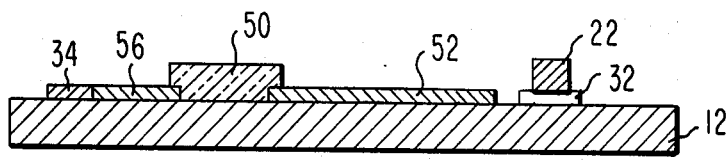
FIG. 3 is a cross-section taken through the structure of FIG. 1 along the line 3—3.

FIG. 1 illustrates a neutron radiation monitor 10 in accordance with a preferred embodiment of the invention. Monitor 10 is a thick film hybrid comprising a substrate 12 having thereon a neutron flux responsive structure 14 and a set 40 of calibration resistors. The neutron flux responsive element 14 comprises a series of four intrinsic silicon radiation sensors 20 connected in series between external terminals 16 and 18. If desired, the monitor 10 may be mounted in a hybrid package with the package's terminals connected to the terminals 16 and 18. It is known that, due to increasing crystal lattice damage, the resistance of intrinsic silicon increases in a predictable way when the silicon is exposed to a neutron flux. The resistance change is determined by the cumulative neutron flux exposure.

Figure 4:
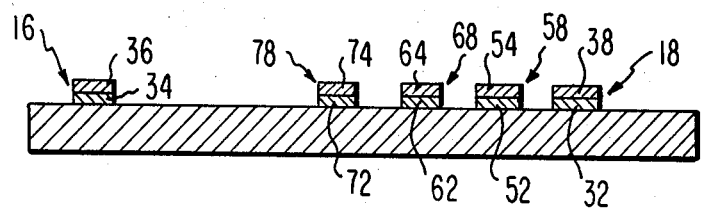
FIG. 4 is a cross-section taken through the structure of FIG. 1 along the line 4—4.

Each sensor element 20 preferably comprises a long intrinsic region 22 having a contact 26 at one end and a contact 30 at the other end. In order to minimize variation in the "resistance" of an element 20 as manufactured, contact 26 is preferably connected to intrinsic region 22 by a thin, heavily doped region 24 having P-type conductivity and contact 30 is preferably connected to intrinsic region 22 by a thin heavily doped N-type region 28, thereby forming a PIN diode with a long intrinsic region. The individual flux responsive elements 20 are preferably affixed to thick film wiring 32 to form a series connection. One end of the series connection is continuous with a common thick film lead 34 which has the external terminal 16 at one end. Terminal 16 is formed by depositing a layer 36 of durable contact material on the thick film wiring 34 as shown in FIG. 4. The external terminal 18 is provided at the other end of the series connection by another durable layer 38 on the thick film wiring 32 as shown in FIG. 4. The elements 20 may be affixed to the thick film wiring 32 in any manner appropriate to thick film hybrids but may preferably be soldered.

Other crystalline materials whose electrical resistance is affected by neutron exposure may be used as the sensor elements 20. These other materials include semiconductors other than silicon and some alloys.

The calibration resistors of set 40 are preferably non-crystalline in order that neutron flux will not affect their values. Set 40 preferably comprises thre calibration resistors $R_1$, $R_2$ and $R_3$ which are identified by reference numerals 50, 60 and 70, respectively. The calibration resistor $R_1$ (50) is preferably a thick film resistor deposited over and between two thick film conductors 52 and 56. The thick film conductor 52 is provided with an external terminal 58 (FIG. 4) by the deposition of a durable contact material 54 over the conductor 52. The thick film wiring 56 is connected to or continuous with common lead 34 and is thus connected to external terminal 16.

Figure 5:
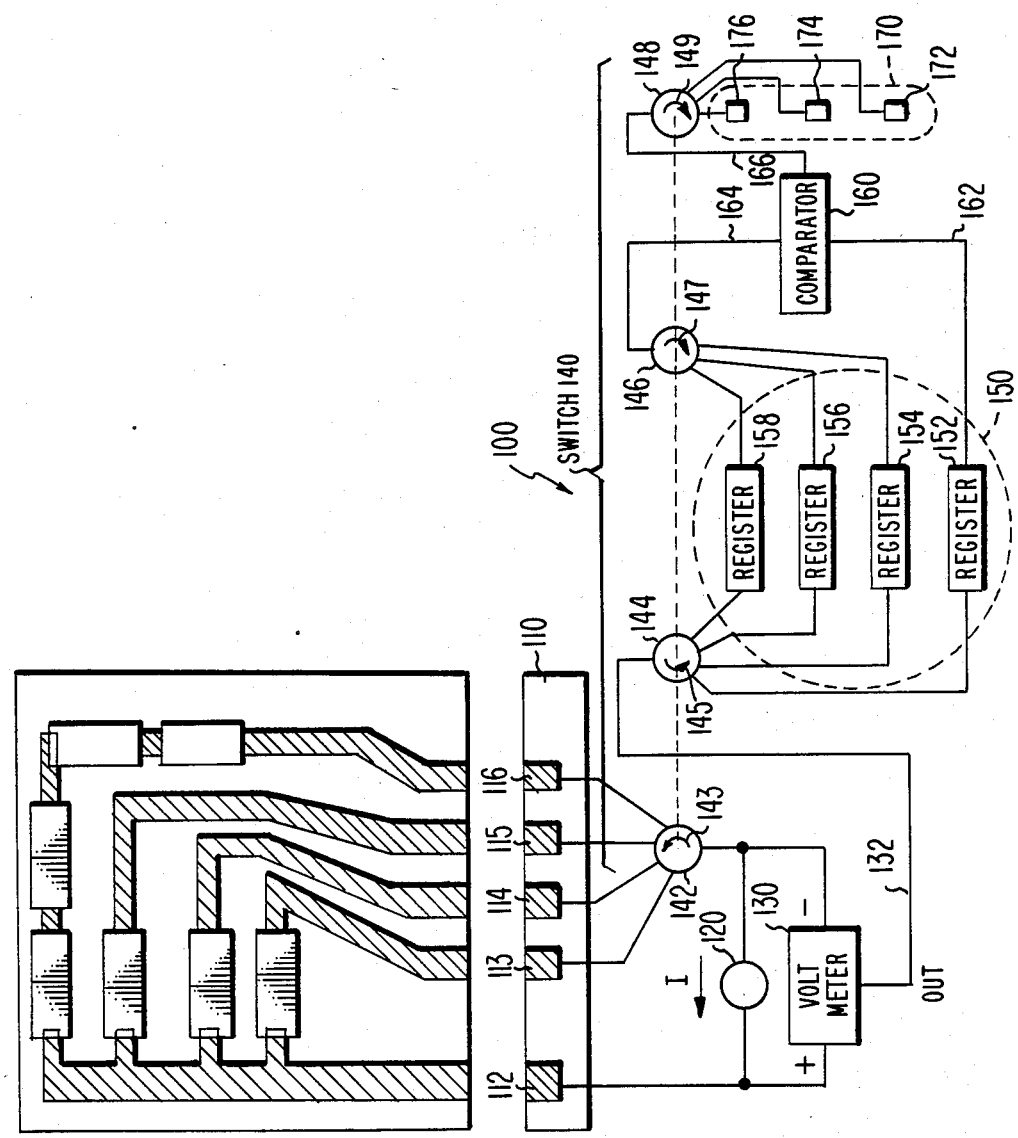
FIG. 5 is a schematic illustration of a monitor reading system for providing automatic readout of the monitor and for determining which calibration levels have been reached.

The calibration resistor $R_2$ (60) is similarly deposited on two thick film conductors 62 and 66 which have external terminals 68 and 16, respectively. The calibration resistor $R_3$ (70) is similarly disposed on and between two thick film conductors 72 and 76 which have external terminals 78 and 16, respectively. The external terminals 16, 18, 58, 68 and 78 are preferably arranged along an edge of substrate 12 as shown, for easy connection of monitor 10 to a monitor reading system 100 via an edge connector 110 (FIG. 5).

Each of the resistors, $R_1$, $R_2$ and $R_3$ is trimmed to an appropriate value after deposition. This trimming may be done in any manner appropriate to the resistor structure utilized. However, it is preferred to utilize active laser trimming to accurately obtain the desired resistor values. Each of the resistors, $R_1$, $R_2$ and $R_3$ has its values selected to be equal to the "effective resistance" the neutron flux responsive structure 14 will have under specified test conditions after that monitor has been exposed to a known, predetermined flux. The resistor values are preferably chosen so that they correspond to flux values which are significant as being limits of safe exposure for different types of equipment and organisms. If desired, one of the resistors may be trimmed to equal the initial characteristics of the flux responsive elements. Since the initial characteristics of the individual flux responsive elements 20 vary somewhat in accordance with production tolerances, the resistance of the flux responsive structure 14 must be measured under test initial conditions in order to accurately establish the values to which calibration resistors $R_1$, $R_2$ and $R_3$ must be trimmed in order that accurate calibration of the sensor structure 14 will result, thereby assuring that a truly self-calibrated (pre-calibrated) neutron radiation monitor will result. Once the calibration resistors are trimmed to these values they become individualized standards peculiar to their associated sensor. Since the initial characteristics of the sensor control this individualization, initial conditions cease to be important for the reading of the monitor. If the calibration resistors instead of being adjusted to have the sensor's post-dosage characteristics, were adjusted to the sensor's initial characteristics then some of the benefits would be lost because knowledge of how a specific sensor's characteristics vary with dosage would need to be known. That is something of its internal structure would need to be known during reading. In contrast, when set to post-dosage values, different sensors can have very different internal structures. The specified test conditions for the flux responsive element 14 are with the contact 16 positive and the contact 18 negative in order that the semiconductor junctions in the devices 20 will be forward biased so that the effect of the change in resistance in the intrinsic region will not be masked by the reverse blocking characteristics of the PIN diodes.

A forward current of 100 milliamps is preferred for simplicity of subsequent measurement in the field. This is a value easily provided in the field and also one which assures that the forward voltage drop of the pn-junctions will vary only slightly, if at all, over the range of neutron exposure and thus will have an insignificant effect on reading the radiation monitor's neutron exposure.

For a particular string of four diodes, with a constant forward current of 100 milliamperes applied, it turns out that exposure of $10^{12}$ neutrons/cm$^2$ will cause a voltage drop across the series string which corresponds to 10 ohms. The resistance value of $R_1$ is then trimmed to correspond to 10 ohms. For the same constant forward current through the string of diodes and an exposure of $10^{13}$ neutrons/cm$^2$, the diode string presents an impedance of 30 ohms. Therefore, the value of resistor $R_2$ is trimmed to be 30 ohms. Under the same current conditions and an exposure of $10^{14}$ neutrons/cm$^2$ the diode string looks like 600 ohms and the value of resistor $R_3$ is trimmed to be 600 ohms. In each of the cases mentioned above, the impedance values are those that can be measured from input to output so that the small impedances represented by the various conductive paths are taken into consideration.

Now with a test current of 100 milliamp applied successively to each of the paths which include $R_1$ (10 ohms), $R_2$ (30 ohms) and $R_3$ (600 ohms) corresponding voltages of 1 volt, 3 volts and 60 volts, respectively, will be produced.

Now it will be seen that if a constant current of 100 milliamps is passed through the diode string and the voltage developed from input to output is, for example, 1.2 volts then there is an indication that the sensor has been exposed to more than $10^{12}$ neutrons/cm$^2$ on an cumulative basis. Later if the same 100 milliamp produces a voltage of 3.5 volts, it is apparent that a cumulative value of $10^{13}$ neutrons/cm$^2$ has been exceeded. In this way, a simple voltage measurement is made on a factory calibrated device to give an indication of neutron exposure without the need for charts or graphs to provide the indication. All that need be done to make these measurements is to apply the same constant current to the diodes and then the resistive paths and determine the value of the voltage developed across the diodes compared to the value of the voltage developed across each of the resistive paths.

A more sophisticated system 100 for reading the exposure of the radiation monitor 10 is schematically illustrated in FIG. 5. A socket or edge connector 110 accepts the monitor to be read. Connector 110 has five contacts 112, 113, 114, 115 and 116 which contact terminals 16, 78, 68, 58 and 18, respectively, upon insertion of the radiation monitor 10 into connector 110. The positioning of both sets of contacts is preferably selected so that contact is only made by insertion in the proper orientation. This system is configured to measure the current voltage characteristics of the sensor and each of the calibration resistors in sequence. Contact 112 of the connector is connected directly to one terminal of a current source 120 and one terminal of a digital voltmeter 130 to connect these terminals to the common thick film conductor 34. Contacts 113–116 are connected to successive contacts on a first wafer 142 of a multi-wafer rotary switch 140. The second terminals of current source 120 and voltage source 130 are connected to the wiper (common or moving) contact 143 on wafer 142 of switch 140. Each of the contacts 113–116 is connected to wiper 143 in succession as switch 140 steps through its four positions.

An output lead (or leads) 132 of digital voltmeter 130 is connected to the ganged wiper(s) 145 of a second wafer (or set of wafers) 144 of switch 140. The four other contacts on wafer 144 are each connected to one of a set 150 of storage/display registers (152, 154, 156 and 158) for display of the voltage developed across resistors $R_1$, $R_2$, $R_3$ and radiation sensor 14, respectively. Each of the registers is connected to lead(s) 132 by switch 140 when the corresponding element of monitor 10 is connected to wiper 143 by switch 140. If voltmeter 130 provides its output in a parallel format, then wafer 144 comprises a set of wafers sufficient to properly connect each of the output lines of the voltmeter to the corresponding input lines of the registers.

A comparator 160 is connected by lead (or leads) 162 to receive the voltage value measured for radiation sensing element 14 as stored in register 152 as one input and the value measured for a selected one of the calibration resistors as stored in registers 154, 156 and 158 as the other input via lead (or leads) 164. This connection of the resistor registers is controlled by a third wafer (or set of wafers) 146 of switch 140. The wiper(s) 147 of wafer(s) 146 is connected to the second comparator input and the outputs from the registers are connected to the individual contacts on the wafer in an order which connects a register's output to the second comparator input at the same time that its input is connected to receive the output of voltmeter 130 on lead 132 via wafer(s) 144.

The output 166 of comparator 160 is selectively connected to specific ones of a set 170 of dosage lights to activate and latch those dosage lights 172, 174 and 176 for resistors $R_1$, $R_2$ and $R_3$, respectively, for whichever resistors the comparator senses that the voltage developed across sensor 14 is greater than the voltage developed across the resistor. Activation of a dosage light occurs if and only if the corresponding dosage has been exceeded. The output line 166 of comparator 160 is connected to the dosage lights via a fourth wafer 148 and its wiper 149 of switch 140 in a manner similar to those of wafers 142, 144 and 146.

Other connection techniques such as solid state switches may be used for connecting the sensor and calibration resistors for measurements and digital logic may be used to connect the registers to comparator 160 and comparator 160 to the dosage lamps 172, 174 and 176. As an alternative to the discrete level sensing obtained in the preferred embodiment, current actual cumulative exposure can be determined by providing the monitor reader with detailed information with respect to the calibration curves of the sensors and by using the values determined from the calibration resistors to determine which specific calibration curve applies to that monitor and then using the value determined from the sensor in combination with the determined calibration curve to establish the actual flux level which has already been accumulated. This may then be displayed in an appropriate register.

Flux sensor 14 could be a single flux responsive element 20 instead of the illustrated series of four. However, the series connection of a plurality of the elements 20 is preferred because it yields a greater sensitivity to the neutron flux and provides resistance levels in the overall structure 14 which are easily measured using standard measurement equipment such as a volt meter when a specified current (such as 100 milliamps) is applied or an ammeter when a specified voltage is applied. The measurements are preferably made in a normal ambient temperature environment to avoid a need for temperature correction (the resistance of the silicon is temperature dependent).

The inclusion of the individually adjusted calibration resistors on the same substrate with the radiation responsive element 14 eliminates all need for traceable calibration documentation to accompany each sensor as has been necessary with prior art devices. However, the conditions for resistance measurement must be specified where PIN diodes are used as elements 20 because the forward voltage drop of their rectifying junctions makes a percentage contribution to the voltage across sensor 14 which varies with the current applied. These measurement conditions can be published or printed on each unit, as desired. A current of 100 milliamps is preferred. If the voltage across sensor 14 is less than the voltage across resistor $R_1$, then the total flux received has not yet reached the value which corresponds to the resistor $R_1$. Similarly, if the voltage across the sensor 14 is between the voltage across resistor $R_1$ and the voltage across resistor $R_2$ then the flux which has been encountered is at least as great as that corresponding to the resistor $R_1$'s value, but not as great as that corresponding to the resistor $R_2$ and so forth, all under the specified measurement conditions.

If desired, more or less than three calibration resistors may be provided just as any desired number of individual elements 20 may be connected in series in forming the flux responsive sensor element 14.

This flux monitoring structure has the advantages of compactness, ready producibility and self-calibration, all of which lead to a radiation monitoring technique which is simple and inexpensive while still being accurate. Cumulative neutron flux is preferably detected while in an unpowered state since the neutron induced crystal damage is independent of applied bias. This detection without power makes this monitor ideal for determining accumulated radiation exposure in isolated locations like individual houses, pastures and so forth.

While in the preferred embodiment the resistors $R_1$, $R_2$ and $R_3$ are trimmed to have values equal to the value which will be obtained by the flux responsive sensor 14 after exposure to known predetermined flux quantities, it will be understood that some known relationship other than equality may be selected if desired. Equality is preferred because it simplifies the problem of determining the flux which has been encountered and the measurements can be accurately made without the need for sophisticated test equipment.

If desired, rather than having terminal 16 common to one end of sensor 14 and one end of each of the resistors, the sensor 14 and each of the resistors may each have two external terminals. The elements 20 are shown as individual discrete blocks of silicon. However, if desired they may be isolated regions in a larger body of silicon. Sensors in accordance with this invention may be fabricated in forms other than thick film hybrids. For example discrete diodes and resistors can be used.

This invention makes it possible to substitute the trimming of a resistor(s), which is easily and economically done, for the difficult and expensive task of establishing and maintaining the traceability of individual calibration curves to individual monitors. In addition, it makes the reading of a monitor a simple process using a relatively simple reading machine. This eliminates the need for skilled laboratory personnel to read monitors and compare their readings accurately with the correct calibration curves. Since the reading machine is easily transported, the machine can be taken to the location of the monitor, rather than returning the monitor to a laboratory for reading.

What is claimed is:

1. A method of determining whether a neutron radiation monitor has been exposed to at least a predetermined cumulative neutron flux value, said radiation monitor including a neutron radiation sensor and at least one calibration resistor the value of said at least one resistor having been trimmed to provide a known relationship to the resistance value of said sensor after said sensor has been exposed to said predetermined neutron flux, said method comprising the steps of:

passing a predetermined current through said neutron radiation sensor;

measuring the voltage across said sensor when passing said predetermined current therethrough to provide a measured sensor voltage;

passing said predetermined current through said at least one trimmed calibration resistor;

measuring the voltage across said at least one trimmed calibration resistor when passing said predetermined current therethrough to provide a measured resistor voltage;

comparing said measured sensor voltage and said measured resistor voltage; and providing an indication that said predetermined flux value has been exceeded if said measured resistor voltage is greater than said measured sensor voltage.

2. A precalibrated neutron radiation monitor for use with a separate reader comprising:
a neutron flux responsive element connected between an input and a first output terminal, said neutron flux responsive element including a body of electrically resistive, neutron sensitive material having:
an initial current-voltage, characteristic,
a resistance which increases with increasing cumulative neutron exposure, and
a subsequent current-voltage characteristic which depends on said initial current-voltage characteristic and the total neutron flux to which said body has been exposed;
at least a first calibration resistor connected between said input terminal and a second output terminal, said calibration resistor having a resistance value which is substantially unaffected by exposure to neutron flux, the resistance value of said first calibration resistor trimmed in accordance with said initial current voltage characteristic of said neutron flux responsive element to provide a current-voltage characteristic under specified measurement conditions which notwithstanding fabrication tolerances has a predetermined relationship to the current-voltage characteristic of said body of neutron sensitive material under said specified measurement conditions after exposure of said neutron sensitive material to a first, known cumulative level of neutron flux.

3. The monitor recited in claim 2 wherein:
said body of neutron sensitive material comprises a body of silicon including an intrinsic region, the resistance of which increases with increasing cumulative neutron exposure.

4. The monitor recited in claim 3 wherein:
said flux responsive element includes a plurality of said regions of intrinsic silicon connected in series between said input terminal and said first output terminal.

5. The monitor recited in claim 3 wherein:
said intrinsic region has first and second spaced apart contacts;
said first contact comprises a region of P-type conductivity contiguous with said intrinsic region and a conductor in ohmic contact with said region of P-type conductivity; and
said second contact comprises a region of an N-type conductivity contiguous to said intrinsic region and a conductor in ohmic contact with said region of N-type conductivity.

6. The monitor recited in claim 2 further comprising:
a second calibration resistor connected between said first input terminal and a third output terminal, said second resistor having a resistance value which is substantially unaffected as a result of exposure to neutron flux, the resistance value of said second calibration resistor trimmed in accordance with said initial current voltage characteristic of said neutron responsive element to provide a current-voltage characteristic under said specified measurement conditions which notwithstanding fabrication tolerances has said predetermined relationship to the current-voltage characteristic of said neutron sensitive material under said specified measurement conditions after exposure of said neutron sensitive material to a second, different, known cumulative level of neutron flux.

7. The monitor recited in claim 2 wherein said known relationship is equality.

8. A neutron radiation monitor comprising:
a thick film hybrid circuit including a substrate having a plurality of thick film conductive paths positioned on a first surface of said substrate;
a plurality of neutron radiation sensitive semiconductor devices each having an initial current voltage characteristic within a fabrication tolerance connected in series in a first conductive path on said surface between an input terminal and a first output terminal, said first conductive path exhibiting known impedance values between said input terminal and said first output terminal after exposure of said radiation sensitive devices to various known cumulative levels of neutron radiation when a given constant current is applied to said first conductive path, said impedance values being dependent on said fabrication tolerances; and
a plurality of calibration resistors connected in a corresponding plurality of conducting paths on said surface between said input terminal and a corresponding plurality of other output terminals, each one of said calibration resistors having a value selected on the basis of the actual initial current voltage characteristic of said first conductive path and different from the values of the other calibration resistors in said plurality, to cause each one of said plurality of conductive paths having a calibration resistor therein to present an impedance between said input terminal and the associated output terminal which notwithstanding said fabrication tolerances corresponds to the impedance of said first conductive path when said radiation sensitive devices are exposed to said various known cumulative levels of neutron radiation, the impedance of each of said plurality of conductive paths corresponding to a different one of said known levels;
whereby the voltage level measured across said first conductive path in response to the application of said constant current can be compared to the voltage levels measured across each of said plurality of conductive paths in response to the application of said constant current to each of said conductive paths in said plurality to provide an indication of the extent of cumulative neutron exposure of said semiconductor devices.

9. The monitor according to claim 8 wherein said semiconductor devices comprise PIN diodes.

10. The monitor according to claim 9 wherein said calibration resistors comprise thick film resistors which are each trimmed such that the impedance of each path in said plurality of paths correspond to a different value of impedance presented by said first path after exposure to different levels of cumulative neutron radiation.

* * * * *